United States Patent
Lanziner

(10) Patent No.: US 12,534,612 B2
(45) Date of Patent: Jan. 27, 2026

(54) CURABLE FLUOROELASTOMERS HAVING LOW SWELLING TENDENCY

(71) Applicant: Carl Freudenberg KG, Weinheim (DE)

(72) Inventor: Arthur Lanziner, Heidelberg (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 18/389,850

(22) Filed: Dec. 20, 2023

(65) Prior Publication Data

US 2024/0117175 A1 Apr. 11, 2024

Related U.S. Application Data

(62) Division of application No. 16/771,236, filed as application No. PCT/EP2018/079808 on Oct. 31, 2018, now abandoned.

(30) Foreign Application Priority Data

Dec. 15, 2017 (DE) .................. 10 2017 011 642.3

(51) Int. Cl.
| | |
|---|---|
| C08L 27/16 | (2006.01) |
| C08K 3/22 | (2006.01) |
| C08K 5/098 | (2006.01) |
| C08K 5/14 | (2006.01) |
| C08K 7/02 | (2006.01) |
| C08L 27/18 | (2006.01) |
| C08L 27/20 | (2006.01) |
| C08L 77/02 | (2006.01) |
| C08L 79/08 | (2006.01) |
| F16J 15/3284 | (2016.01) |

(52) U.S. Cl.
CPC .............. *C08L 27/16* (2013.01); *C08K 3/22* (2013.01); *C08K 5/098* (2013.01); *C08K 5/14* (2013.01); *C08K 7/02* (2013.01); *C08L 27/18* (2013.01); *C08L 27/20* (2013.01); *F16J 15/3284* (2013.01); *C08K 2003/2206* (2013.01); *C08K 2003/2224* (2013.01); *C08K 2003/2234* (2013.01); *C08K 2003/2296* (2013.01); *C08K 2201/003* (2013.01); *C08K 2201/005* (2013.01); *C08L 77/02* (2013.01); *C08L 79/08* (2013.01); *C08L 2205/16* (2013.01); *C08L 2205/22* (2013.01); *C08L 2312/00* (2013.01)

(58) Field of Classification Search
CPC ....................................... C08L 79/08
See application file for complete search history.

(56) References Cited

U.S. PATENT DOCUMENTS

| | | | |
|---|---|---|---|
| 4,694,045 A | 9/1987 | Moore | |
| 4,957,975 A * | 9/1990 | Carlson | C08K 5/19 525/359.1 |
| 5,151,492 A | 9/1992 | Abe | |
| 5,674,959 A | 10/1997 | Arcella | |
| 5,717,036 A | 2/1998 | Saito | |
| 6,221,971 B1 * | 4/2001 | Tabb | C08K 3/22 525/326.3 |
| 6,291,576 B1 * | 9/2001 | Schmiegel | C08K 3/34 524/544 |
| 7,323,515 B2 | 1/2008 | Hayashida | |
| 2005/0014900 A1 * | 1/2005 | Park | C08F 8/00 525/191 |
| 2005/0054753 A1 * | 3/2005 | Hayashida | C09K 3/1009 523/223 |
| 2006/0148954 A1 * | 7/2006 | Park | C08L 27/12 524/502 |
| 2007/0037922 A1 * | 2/2007 | Tanaka | F16J 15/102 524/544 |
| 2007/0222108 A1 * | 9/2007 | Warkoski | C09D 179/08 524/544 |
| 2014/0154454 A1 * | 6/2014 | Ueki | C08K 3/04 977/773 |
| 2014/0155551 A1 * | 6/2014 | Oriani | C08K 5/14 525/178 |

FOREIGN PATENT DOCUMENTS

| | | |
|---|---|---|
| CA | 2067891 A1 | 11/1992 |
| EP | 1464676 A1 | 10/2004 |
| JP | 4177984 B2 | 11/2008 |
| WO | WO 2010076889 A1 | 7/2010 |
| WO | WO 2014088919 A1 | 6/2014 |
| WO | WO 2017199222 A1 | 11/2017 |

OTHER PUBLICATIONS

Mitsui, AURUM-MATWeb-Material Property Data, pp. 1-3, MatWeb, LLC, retrieved Sep. 6, 2022 (Year: 2022).*
ASTM D-1418 (Year: 2022).*
MetWeb Material Data Sheet (Year: 2022).*

* cited by examiner

*Primary Examiner* — Katarzyna I Kolb
(74) *Attorney, Agent, or Firm* — LEYDIG, VOIT & MAYER, LTD.

(57) ABSTRACT

The invention relates to a curable fluoroelastomer composition having low swelling tendency, comprising: A) a curable fluoroelastomer; B) a curing system; and C) 0.1 wt.-% to 30 wt.-% of a nitrogen-containing polymer, selected from polyimide, polyimide, mixtures and/or copolymers thereof, each relative to the total weight of fluoroelastomer and nitrogen-containing polymer, the nitrogen-containing polymer being present in particulate form of an average particle size in the range of 0.15 to 70 μm and/or in fiber form having an average fiber diameter in the range of 0.15 to 70 μm.

17 Claims, No Drawings

CURABLE FLUOROELASTOMERS HAVING LOW SWELLING TENDENCY

CROSS-REFERENCE TO RELATED APPLICATIONS

This application is a divisional of U.S. application Ser. No. 16/771,236 filed on Jun. 10, 2020 as a U.S. National Stage Application under 35 U.S.C. § 371 of International Application No. PCT/EP2018/079808, filed on Oct. 31, 2018, and claims benefit to German Patent Application No. DE 10 2017 011 642.3, filed on Dec. 15, 2017. The International Application was published in German on Jun. 20, 2019, as WO 2019/115083 A1 under PCT Article 21(2).

FIELD

This invention relates to curable fluoroelastomers having a low tendency to swell.

BACKGROUND

Fluoroelastomers (FKM) are characterized by excellent physical and chemical properties, such as high heat resistance, oil resistance and chemical resistance, and are therefore widely used as sealing materials. Examples of fluoroelastomers include copolymers containing units of vinylidene fluoride (VF2) and units of at least one other copolymerizable fluorine-containing monomer, such as hexafluoropropylene (HFP), tetrafluoroethylene (TFE), chlorotrifluoroethylene (CTFE), vinyl fluoride (VF), and fluorovinyl ethers, such as a perfluoro(alkyl vinyl ether) (PAVE). Specific examples of PAVE include perfluoro(methyl vinyl ether), perfluoro(ethyl vinyl ether) and perfluoro (propyl vinyl ether).

To improve their mechanical properties, such as tensile strength or elongation, elastomers are cured, i.e., vulcanized or crosslinked. In the case of fluoroelastomers, this is generally accomplished by mixing uncured polymer (i.e. fluoroelastomer rubber) with a polyfunctional curing agent and heating the resulting mixture. Here, a chemical reaction of the curing agent takes place with active sites along the polymer backbone or side chains, whereby a crosslinked polymer composition having a three-dimensional network structure is obtained.

Conventional curing agents for fluoroelastomers include a radical-generating agent, such as an organic peroxide in combination with a multifunctional crosslinking co-agent. Typically, a metal oxide is added to this combination to improve the curing reaction (i.e., both the curing intensity and the curing rate). A disadvantage of using a metal oxide, however, is that the cured fluoroelastomers obtainable in this way, when exposed to organic acids or acidic media comprising hydrocarbon blends (fuel, oil) for some time or at elevated temperatures, show very high volume swelling (e.g. 20-200 vol %) which can lead to sealing failure. Such swelling can be prevented or at least minimized by eliminating metal oxides from the compositions. However, this leads to a deterioration of the high-temperature properties of the elastomer, in particular of the tensile strength at high temperatures. Moreover, fluoroelastomer materials, wherein metal oxides are eliminated from the compositions, exhibit a significantly increased mold soiling tendency which is considered to be a degraded processing property.

WO 2014088919 (A1) describes a curable fluoroelastomer composition comprising: A) a peroxide-curable fluoroelastomer; B) an organic peroxide; C) a multifunctional co-agent; and D) 0.5 wt % to 30 wt % polyamide in relation to the total weight of fluoroelastomer and polyamide. The preparation of the fluoroelastomer composition comprises the steps of: A) providing a peroxide-curable fluoroelastomer; B) providing a polyamide having a melting temperature or glass transition temperature; C) mixing the peroxide-curable fluoroelastomer with the polyamide at a temperature greater than whichever is the higher of the melting temperature and glass transition temperature of the polyamide; D) cooling the polymer mixture to solidify the polyamide; and E) adding a peroxide curing agent and a multifunctional co-agent to the polymer mixture at a temperature lower than whichever is the lower of the melting temperature and glass transition temperature of the polyamide.

The preparation method described is used to incorporate the polyamide into the fluoroelastomer in molten form. As a result, the fluoroelastomer composition is present as a polymer blend, i.e., the polyamide is present in the fluoroelastomer in a molecularly distributed or microscopically dispersed form. It has been found in practical trials that such fluoroelastomer compositions cure well even in the absence of metal oxides so that a low tendency to swell and good heat resistance can be achieved with them. A disadvantage of these compositions, however, is that they exhibit a non-satisfactory compression set.

SUMMARY

The object of the present invention is to provide a fluoroelastomer composition showing not only a low tendency to swell and good heat resistance but also a good compression set.

This object is achieved by a curable fluoroelastomer composition comprising:
 A) a preferably radically curable fluoroelastomer;
 B) in a curing system; and
 C) 0.1 wt % to 30 wt % of a nitrogen-containing polymer selected from the group of polyamide, polyimide, mixtures and/or copolymers thereof, in each case based on the total weight of fluoroelastomer and nitrogen-containing polymer, wherein the nitrogen-containing polymer is present in particle form with an average particle size in the range from 0.15 to 70 µm and/or in fiber form with an average fiber diameter in the range from 0.15 to 70 µm.

DETAILED DESCRIPTION

It has been found that the fluoroelastomer composition according to the invention, comprising as an additive the nitrogen-containing polymer in particle form with an average particle size in the range from 0.15 to 70 µm and/or in fiber form with an average fiber diameter in the range from 0.15 to 70 µm, surprisingly exhibits both a low tendency to swell and good heat resistance and a good compression set expressed by a significantly improved tensile strength even after heat aging, for example at 250° C.

According to the invention, the fluoroelastomer composition contains nitrogen-containing polymer selected from polyamide, polyimide, mixtures and/or copolymers thereof, each in particle form with an average particle size in the range from 0.15 to 70 µm and/or in fiber form with an average fiber diameter in the range from 0.15 to 70 µm. If present in particle form, the nitrogen-containing polymer preferably has an average particle size in the range from 0.2 to 50 µm, more preferably in the range from 0.3 to 30 µm, more preferably in the range from 0.4 to 20 µm, more preferably in the range from 0.4 to 12.5 µm, in particular in the range from 0.4 to 8 µm, and/or, if present in fiber form, has an average fiber diameter in the range from 0.2 to 50 µm, more preferably in the range from 0.3 to 30 µm, more preferably in the range from 0.4 to 20 µm, more preferably in the range from 0.4 to 12.5 µm, in particular in the range from 0.4 to 8 µm.

According to the invention, the mean particle size is determined according to ISO 13320 and the average fiber diameter is determined by image analysis.

In a preferred embodiment of the invention, the fluoroelastomer composition has an amount of metal oxide functioning as an acid acceptor, in particular zinc oxide, magnesium oxide, calcium oxide and/or lead oxide (PbO/Pb$_3$O$_4$) of less than 1.5 wt %, and/or an amount of metal hydroxide functioning as an acid acceptor, in particular calcium hydroxide, of less than 1.5 wt %, and/or an amount of metal salt functioning as an acid acceptor, in particular hydrotalcite, calcium and/or magnesium stearate of less than 5 wt %, wherein the quantities are based in each case on the total weight of the fluoroelastomer composition.

According to the invention, the fluoroelastomer composition contains a curable fluoroelastomer. Preferably, the amount of fluoroelastomer in the fluoroelastomer composition is 40 wt % to 95 wt %, in particular 50 wt % to 90 wt %, based in each case on the total weight of the fluoroelastomer composition.

Various types of fluoroelastomers are suitable for use as a curable elastomer. Suitable fluoroelastomers include, in particular, those classified as FKM, FFKM and FTPM in ASTM-D 1418, "Standard Practice for Rubber and Rubber Lattice Nomenclature".

The term FKM is used for fluoroelastomers that use vinylidene fluoride as comonomer. Various types of fluoroelastomers are commercially available. A first type may be described chemically as a copolymer of hexafluoropropylene and vinylidene fluoride. These fluoroelastomers tend to have an advantageous combination of overall properties. Some commercial embodiments are available with about 66 wt % fluorine. Another type of FKM may be described chemically as a terpolymer of tetrafluoroethylene, hexafluoropropylene and vinylidene fluoride. Such elastomers tend to have high heat resistance and good resistance to aromatic solvents. They are commercially available with, for example, 68-69.5 wt % fluorine. Another FKM is described chemically as a terpolymer of tetrafluoroethylene, a fluorinated vinyl ether and vinylidene fluoride. Such elastomers tend to have improved low temperature performance. In various embodiments, they are available with 62-68 wt % fluorine.

Another type of fluoroelastomer is described as a terpolymer of tetrafluoroethylene, propylene and vinylidene fluoride. Such fluoroelastomers tend to have improved base resistance. Some commercial embodiments contain about 67 wt % fluorine. Another type of fluoroelastomer may be described as a pentapolymer of tetrafluoroethylene, hexafluoropropylene, ethylene and a fluorinated vinyl ether and vinylidene fluoride. Such elastomers typically have improved base resistance and improved low temperature performance.

Another category of fluoroelastomers is referred to as FFKM. Such elastomers can be referred to as perfluoroelastomers because the polymers are fully fluorinated and do not contain any carbon-hydrogen bonding. FFKM fluoroelastomers are generally characterized by excellent fluid resistance. They were originally introduced by DuPont under the registered trade name Kalrez®. Further suppliers are Daikin and Ausimont.

Another category of fluoroelastomers is referred to as FTPM. Typical of this category are the copolymers of propylene and tetrafluoroethylene. The category is characterized by high resistance to basic materials, such as amines.

Suitable fluoroelastomers include commercially available copolymers of one or more fluorine-containing monomers, mainly vinylidene fluoride (VDF), hexafluoropropylene (HFP), tetrafluoroethylene (TFE), and perfluorovinyl ether (PFVE). Preferred PFVE include those having a C1-8 perfluoroalkyl group, preferably perfluoroalkyl groups having 1 to 6 carbon atoms, and especially perfluoromethyl vinyl ether and perfluoropropyl vinyl ether.

In addition, the copolymers may also contain repeating units derived from olefins, such as ethylene (Et) and propylene (Pr).

In various preferred embodiments, the fluoroelastomer is a so-called base-resistant fluoroelastomer. Such base-resistant fluoroelastomers also include fluoro-olefin copolymers. Particularly preferred is a copolymer of tetrafluoroethylene having at least one C2-4 olefin and so-called cure site monomers (CSM).

The fluoroelastomer may contain repeating units derived from one or more additional fluorine-containing monomers. As such, the cured elastomeric material comprises repeating units derived from tetrafluoroethylene and at least one C2-4 olefin, and further comprises peroxide crosslinking sites.

In a preferred embodiment, the fluoroelastomer comprises repeating units derived from 10-90 mol % tetrafluoroethylene, 10-90 mol % C2-4 olefin and up to 30 mol % from one or more additional fluorine-containing monomers. Preferably, the repeating units are derived from 25-90 mol % tetrafluoroethylene and 10-75 mol % C2-4 olefin. In another preferred embodiment, the repeating units are derived from 45-65 mol % tetrafluoroethylene and 20-55 mol % C2-4 olefin.

In a particularly preferred embodiment, the molar ratio of tetrafluoroethylene units to C2-4 olefin repeating units is from 60:40 to 40:60. In various embodiments, the fluoroelastomer comprises alternating units of C2-4 olefins and tetrafluoroethylene. In such polymers, the molar ratio of tetrafluoroethylene to C2-4 olefin is about 50:50.

In another embodiment, the fluoroelastomers are provided as block copolymers having an A-B-A structure, wherein A represents a block of polytetrafluoroethylene and B represents a block of polyolefin.

A preferred C2-4 olefin is propylene. Fluoroelastomers based on copolymers of tetrafluoroethylene and propylene are commercially available, for example, from Asahi under the registered trade name Aflas®.

A preferred additional monomer in the fluoroelastomer is vinylidene difluoride. Other fluorine-containing monomers that can be used in the fluoroelastomers of the present invention include, without limitation, perfluoroalkyl vinyl compounds, perfluoroalkyl vinylidene compounds, and perfluoroalkoxy vinyl compounds.

Hexafluoropropylene (HFP) is an example of a perfluoroalkyl vinyl monomer. Perfluoromethyl vinyl ether is an example of a preferred perfluoroalkoxy vinyl monomer. For example, rubbers based on copolymers of tetrafluoroethylene, ethylene, and perfluoromethyl vinyl ether are commercially available from DuPont under the registered trade name Viton® ETP.

Fluoroelastomers used to prepare the processable rubber compositions of the invention can be typically prepared by radical emulsion polymerization of a monomer mixture containing the desired molar ratios of the starting monomers. Initiators are typically organic or inorganic peroxide compounds, and the emulsifier is typically a fluorinated acid soap. The molecular weight of the polymer formed can be controlled by the relative amounts of initiators used as compared to the monomer content and the choice of the transfer agent, if any. Typical transfer agents include carbon tetrachloride, methanol and acetone. Emulsion polymerization can be carried out under discontinuous or continuous conditions. Such fluoroelastomers are commercially available as indicated above.

As described above, the fluoroelastomers used in the compositions and methods of the invention preferably contain repeating units derived from one or more fluorine-containing olefinic monomers.

The fluoroelastomers are curable according to the invention. Preferably, the fluoroelastomers are radically and/or ionically curable.

Radically curable fluoroelastomers are to be understood as meaning fluoroelastomers that contain so-called crosslinking sites.

In a preferred embodiment, the radically curable fluoroelastomers contain repeating units as crosslinking sites, based on so-called cure site monomers (CSM) which are described in more detail below. The repeating units are based on the corresponding monomers in the sense that the structure of the polymer results from copolymerization of the monomers and the resulting structure is the addition polymerization product of the monomers. In the cured fluoroelastomers, at least some of the repeating units derived from the cure site monomers are crosslinked. In one embodiment, crosslinking is achieved by the reaction of multifunctional crosslinking co-agents with radicals at the crosslinking sites which is induced, for example, by the action of an organic peroxide of the radical cure system.

In various embodiments, the radically curable fluoroelastomers contain up to 5 mol %, for example from 0.05 to 5 mol % repeating units that are based on the so-called cure site monomers. In one embodiment, the crosslinking sites are based on halogen-containing olefin monomers, the halogen being chlorine, bromine, iodine, or combinations thereof. If used, the repeating units of a halogen-containing olefin are preferably present in an amount to provide at least about 0.05% wt % halogen in the fluoroelastomer, preferably 0.3% wt % halogen or more. In a preferred embodiment, the total weight of halogen in the fluoroelastomer is 1.5 wt % or less.

The cure site monomers produce crosslinking sites in the fluoroelastomer which preferably react at high speed with radical initiators, such as peroxides. They react faster than other parts of the elastomer. Crosslinking is thus preferably effected at the crosslinking sites. This crosslinking effect is at least partially responsible for the elastomeric properties in the elastomer. Non-limiting examples of cure site monomers include brominated, chlorinated and iodinated olefins; brominated, chlorinated and iodinated unsaturated ethers; and non-conjugated dienes.

In preferred embodiments, the radically curable fluoroelastomers are peroxide-curable fluoroelastomers, preferably comprising at least one halogenated crosslinking site or a reactive double bond resulting from the presence of a copolymerized unit of a non-conjugated diene. The double bond of the cure site monomer is referred to herein as an olefin. Functional groups associated with the cure sites thus include a carbon-bromine (C—Br) bond, a carbon-iodide (C—I) bond, a carbon-chlorine (C—Cl) bond, and an olefin.

In various embodiments, halogenated crosslinking sites are provided by copolymerized cure site monomers and/or by halogen atoms present at the terminal positions of the fluoroelastomer polymer chain. In general, the halogenated crosslinking sites are referred to as repeating units stemming from a cure site monomer. Copolymerized cure site monomers, reactive double bonds and halogenated end groups are capable of reacting by forming crosslinks, in particular under catalysis or initiation by the action of peroxides.

As can be seen from this discussion, the repeating units of an uncured fluoroelastomer that are based on cure site monomers contain one or more of these functional groups. In cured elastomers, at least some of the functional groups are reacted with the curing system. In both cases, the elastomer contains repeating units stemming from cure site monomers.

Brominated cure site monomers may contain other halogens, preferably fluorine. Examples are bromo trifluoroethylene, 4-bromo-3,3,4,4-tetrafluorobut-1-ene and others, such as vinyl bromide, 1-bromo-2,2-difluoroethylene, perfluoroallyl bromide, 4-bromo-1,1,2-trifluorobutene, 4-bromo-1,1,3,3,4,4-hexafluorobutene, 4-bromo-3-chloro-1,1,3,4,4-pentafluorobutene, 6-bromo-6-tetrafluorohexene, 4-bromo perfluorobut-1-ene and 3,3-difluorallyl bromide. Brominated unsaturated ether cure site monomers usable in the invention include ethers, such as 2-bromo perfluoroethylperfluorovinyl ethers and fluorinated compounds of the CF2Br—Rf—O—CF—CF2 (Rf is perfluoroalkylene) class, such as CF2BrCF2OCF—CF2 and fluorovinyl ethers of the ROCF—CFBr or ROCBr—CF2 class, where R is a lower alkyl group or fluoroalkyl group, such as CH3OCF—CFBr or CF3CH2OCF—CFBr.

Iodinated olefins can also be used as cure site monomers. Suitable iodinated monomers include iodinated olefins of the formula: CHR—CH—Z—CH2-CHR—I where R is —H or —CH3; Z is a C1-C18 (per)fluoroalkylene radical, linear or branched, optionally containing one or more ether oxygen atoms, or a (per)fluoropolyoxyalkylene radical as described in U.S. Pat. No. 5,674,959. Other examples of suitable iodinated cure site monomers are unsaturated ethers of formula I(CH2CF2CF2)nOCF—CF2, and ICH2CF2O[CF(CF3)CF2O]nCF—CF2 and the like, as described in U.S. Pat. No. 5,717,036. In addition, suitable iodinated cure site monomers can be used, including iodo-ethylene, 4-iodo-3,3,4,4-tetrafluorobutene-1,3-chloro-4-iodo-3,4,4-trifluoromethyl, 2-iodo-1,1,2,2-tetrafluoro-1-(vinyloxy)ethane; 2-iodo-1-(perfluorovinyloxy)-1,1,2,2-tetrafluoroethylene; 1,1,2,3,33-hexafluoro-2-iodone-1-(perfluorovinyloxy) propane; 2-iodo ethyl vinyl ether; 3,3,4,5,5,5-hexafluoro-4-iodopentene; and iodo-trifluoroethylene as described in U.S. Pat. No. 4,694,045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the above listed cure site monomers, preferred compounds include 4-bromo-3,3,4,4-tetrafluorobut-1-ene; 4-iodo-3,3,4,4-tetrafluorobut-1-ene; and bromo-trifluoroethylene. Additionally or alternatively, cure site monomers and repeating units derived therefrom and containing iodine, bromine or mixtures thereof are present at the ends of the fluoroelastomeric chains as a result of the use of chain transfer or molecular weight regulating agents during the preparation of the fluoroelastomers. Such agents include iodine-containing compounds that yield iodine bound at one or both ends of the polymer molecules. Methylene iodide;

1,4-diiodine-perfluoro-n-butane; and 1,6-diiodine-3,3,4,4-tetrafluorohexane are representative of such agents. Other iodinated chain transfer agents include 1,3-diiodine-perfluoropropane; 1,4-diiodine-perfluorobutane; 1,6-diiodine-perfluorohexane; 1,3-diiodine-2-chloroperfluoropropane; 1,2-di (iododifluoromethyl)perfluorocyclobutane; monoiodperfluoroethane; monoiodperfluorobutane; and 2-iodo-1-hydroperfluoroethane. Diiodinated chain transfer agents are particularly preferred. Examples of brominated chain transfer agents include 1-bromo-2-iodoperfluoroethane; 1-bromo-3-iodoperfluoropropane; 1-iodo-2-bromo-1,1-difluoroethane and others as disclosed in U.S. Pat. No. 5,151,492.

Non-limiting examples of peroxide-curable fluoroelastomers include VDF/HFP/CSM, VDF/HFP/TFE/CSM, VDF/PFVE/TFE/CSM, TFE/Pr/CSM, TFE/Pr/VDF/CSM, PFVE/VDF/CSM, TFE/Et/PFVE/CSM and TPE/PFVE/CSM, with CSM representing at least one cure site monomer. The name of the elastomer indicates the monomers from which the elastomeric rubbers are synthesized. In some embodiments, the elastomeric rubbers have viscosities that result in a Mooney viscosity of generally 15-160 (ML1+10, large rotor at 121° C.). Elastomeric suppliers include Dyneon (3M), Asahi glass fluoropolymers, Solvay/Ausimont, DuPont and Daikin.

The radical curing system (B) preferably contains a radical initiator and a crosslinking co-agent. It is believed that the radical initiator acts by first extracting a hydrogen or halogen atom from the fluoroelastomer to produce a free radical that can be crosslinked. The above-described cure site monomers are believed to provide sites that react with the radical initiator at an accelerated rate so that the subsequent crosslinking described below occurs primarily at the crosslinking sites. These crosslinking sites contain the free radicals which can react with the unsaturated sites of the crosslinking co-agents.

Crosslinking co-agents contain at least two unsaturated, preferably olefinically unsaturated sites.

In various embodiments, the radical initiators have a peroxide functionality. Numerous organic peroxides are known as examples of radical initiators and are commercially available. The radical initiators, including the organic peroxides, can be activated over a wide temperature range. The activation temperature can be described using a parameter known as half-life (T½). Typical values for half-lives of, for example, 0.1 hours, 1 hour and 10 hours are given in degrees Celsius. For example, at 0.1 hours at 143° C., a T½ indicates that at this temperature, half of the radical initiator will decompose within 0.1 hours. Organic peroxides having a T½ at 0.1 hours of 118° C. to 228° C. are commercially available. Such peroxides have a half-life of at least 0.1 hours at the stated temperatures. The T½ values indicate the kinetics of the initial reaction when crosslinking the fluoroelastomers, i.e. the decomposition of the peroxide forming a radical-containing intermediate.

Non-limiting examples of commercially available organic peroxides for initiating curing of fluoroelastomers include butyl-4,4-di-(tert-butylperoxy)valerate; tert-butyl peroxybenzoate; di-tert-amyl peroxide; dicumyl peroxide; di(tert-butylperoxyisopropyl)benzene; 2,5-dimethyl-2,5-di(tert-butylperoxy)hexane; tert-butylcumylperoxide; 2,5-dimethyl-2,5-di(tert-butylperoxy)hex-3-ine; di-tert-butylperoxide; 3,6,9-triethyl-3,6,9-trimethyl-1,4,7-triperoxonane; 1,1,3,3-tetramethylbutyl hydroperoxide; diisopropylbenzene monohydroperoxide; cumylhydroperoxide; tert-butylhydroperoxide; tert-amylhydroperoxide; tert-butylperoxyisobutyrate; tert-amyl peroxyacetate; tert-butylperoxy stearyl carbonate; di(1-hydroxycyclohexyl)peroxide; ethyl-3,3-di(tert-butylperoxy)butyrate; and tert-butyl-3-isopropenylcumylperoxide.

Non-limiting examples of crosslinking co-agents include triallyl cyanurate; triallyl isocyanurate; tri(methallyl)-isocyanurate; tris(diallylamine)-s-triazine; N, N, N', N'-tetraallyl terephthalamide; N, N, N', N'-tetraallylmalonamide, trivinyl isocyanurate; 2,4,6-trivinylmethyltrisiloxane; and tri(5-norbornene-2-methylene)cyanurate. The crosslinking co-agents preferably contain at least two sites of olefinic unsaturation. The unsaturated sites react with the free radical produced on the fluoroelastomer molecule and crosslink the elastomer. A commonly used crosslinking agent is triallyl isocyanurate (TAIC).

Ionically curable fluoroelastomers are those that can be cured with amines, preferably diamines and/or polyols, preferably bisphenols. Ionically curable fluoroelastomers are well known and described in the literature, for example in Albert L. Moore, Fluoroelastomers Handbook: The Definitive User's Guide and Databook.

In addition to the fluoroelastomer, curing system, and nitrogen-containing polymer, other additives, such as stabilizers, processing aids, curing accelerators, fillers, pigments, dyes, adhesives, tackifiers and waxes may be added to the fluoroelastomer composition of the present invention.

A wide variety of processing aids may be used, including plasticizers and mold release agents. Non-limiting examples of processing aids include carnauba wax, ester plasticizers, such as dioctyl sebacate (DOS), fatty acid salts, such as zinc stearate and sodium stearate, polyethylene wax and ceramide. In some embodiments, high temperature processing aids are preferred. They include, without limitation, linear fatty alcohols, such as mixtures of C10-C28 alcohols, organosilicones and functionalized perfluoropolyethers. In some embodiments, the compositions contain from about 0.5 to about 15 wt % processing aids, preferably from about 0.5 to about 10 wt %.

As discussed above, the fluoroelastomer composition of the present invention preferably contains no to minor amounts of the commonly preferred acid acceptor compounds comprising oxides and hydroxides of divalent metals. Non-limiting examples include Ca(OH)2, MgO, CaO and ZnO. Preferably, the compositions of the invention are substantially free of acid acceptors, especially the aforementioned acid acceptors, "substantially free" meaning less than 0.1 (preferably 0) parts by weight per 100 parts by weight of fluoroelastomer.

Non-limiting examples of fillers include both organic and inorganic fillers, such as barium sulfate, carbon black, graphite, plastic powders, such as PTFE powder, silica, titanium dioxide, glass fiber, fumed silica, graphenes and fibers, such as mineral fibers, plastic fibers, such as ultra-high molecular weight polyethylene fibers, carbon fibers, carbon nano tubes (CNTs), boron fibers. In various embodiments, fillers, such as plastic powders, for example PTFE powder, graphite and CNT, are used to improve wear resistance and other properties of moldings intended for use as dynamic seal members, for example.

In a preferred embodiment, fillers, such as carbon black, can account for up to about 70 wt % of the total weight of the compositions of the invention. The compositions preferably comprise from 1 to 50 wt % filler. In other embodiments, the filler accounts for 10 to 30 wt % of the compositions.

The fluoroelastomer, the curing system, the nitrogen-containing polymer, and any other components can be incorporated into a curable fluoroelastomer composition by methods conventional in the rubber industry, for example by means of an internal mixer or rolling mill at a temperature below the melting temperature of the nitrogen-containing polymer. Other ingredients that may be added include those commonly used in fluoroelastomer compositions as described above.

The resulting curable composition may then be shaped (e.g., molded or extruded) and cured to form a fluoroelastomer article. Curing typically takes place at about 150 to 200° C. for 1 to 60 minutes.

Conventional suitable rubber curing presses, molds, extruders and the like may be used. For optimum physical properties and dimensional stability, it is also preferred to perform a post-curing process in which the molded or extruded fluoroelastomer article is heated in an oven or the like for an additional period of about 1 to 48 hours, typically from about 180 to 275° C.

The nitrogen-containing polymers contained in the fluoroelastomer composition are selected according to the invention from polyamide, polyimide, mixtures and/or copolymers thereof. These polymers can be amorphous, semicrystalline or crystalline and linear, branched, crosslinked or uncrosslinked.

According to the invention, the amount of nitrogen-containing polymer in the fluoroelastomer composition is 0.1 wt % to 30 wt %, preferably from 0.1 wt % to 15 wt %, more preferably from 0.1 wt % to 10 wt %, even more preferably from 0.1 wt % to 5 wt % based in each case on the total weight of fluoroelastomer and nitrogen-containing polymer.

Particularly suitable nitrogen-containing polymers are those having a melting temperature determined according to ASTM D3418-08 or decomposition temperature of more than 180° C., preferably from 180° C. to 1000° C., preferably greater than 190° C., for example from 190° C. to 1000° C., more preferably greater than 200° C., for example from 200° C. to 1000° C., most preferably greater than 215° C., for example from 215° C. to 1000° C. Preferably, the nitrogen-containing polymer is solid at the curing temperature of the fluoroelastomer, meaning that the curing temperature of the fluoroelastomer is lower than the greater of the melting temperature, glass transition temperature and decomposition temperature of the polymer.

Polyamides useful in the practice of the invention include: aliphatic polyamides, such as nylon 6, nylon 7, nylon 6/6, nylon 6/10, nylon 6/12, nylon 11, nylon 12, aromatic and partially aromatic polyamides, such as p-aramid, m-aramid, polyphthalamides, and aliphatic, aromatic, and/or partially aromatic polyamide copolymers, such as copoly(amide-ether), copoly(amide-ester).

In certain embodiments, a polyamide having an amine end group content greater than 30 mEq/kg may be desirable.

Examples of polyamides include polyhexamethylene adipamide (6,6 nylon), polyhexamethylene azelamide (6,9 nylon), polyhexamethylene sebacamide (6,10 nylon), and polyhexamethylene dodecanamide (6,12 nylon), the polyamide being prepared by ring-opening of lactams, i.e., polycaprolactam, polylauriclactam, poly-11-aminoundecanoic acid and poly-bis(p-aminocyclohexyl)methane dodecanoamide. It is also possible to use polyamides prepared by copolymerization of two of the above polymers or by terpolymerization of the above polymers or their components, such as adipic acid isophthalic acid hexamethylenediamine copolymer. Typically, polyamides are condensation products of one or more dicarboxylic acids and one or more diamines and/or one or more aminocarboxylic acids and/or ring-opening polymerization products of one or more cyclic lactams.

Aliphatic polyamides useful in the practice of the present invention can be formed from aliphatic and alicyclic monomers, such as diamines, dicarboxylic acids, lactams, aminocarboxylic acids and their reactive equivalents. A suitable aminocarboxylic acid is 1,1-aminododecanoic acid. Suitable lactams are caprolactam and laurolactam. Linear, branched and cyclic monomers may be used.

Carboxylic acid monomers that can be used to prepare aliphatic polyamides include aliphatic carboxylic acids, such as adipic acid, pimelic acid, suberic acid, azelaic acid, decanedioic acid, dodecanedioic acid, tridecanedioic acid, tetradecanedioic acid and pentadecanedioic acid. Diamines can be selected from diamines having four or more carbon atoms, including but not limited to tetramethylenediamine, hexamethylenediamine, octamethylenediamine, decamethylenediamine, dodecamethylenediamine, 2-methylpentamethylenediamine, 2-ethyltetramethylenediamine, 2-methyloctamethylenediamine, trimethylhexamethylenediamine, meta-xylylenediamine and/or mixtures thereof.

Aromatic and partially aromatic polyamides are homopolymers, dipolymers, terpolymers or higher order polymers formed from monomers containing aromatic groups. One or more aromatic carboxylic acids may be terephthalic acid or a mixture of terephthalic acid with one or more other carboxylic acids, such as isophthalic acid, phthalic acid, 2-methylterephthalic acid and naphthalic acid. Moreover, the one or more aromatic carboxylic acids may be mixed with one or more aliphatic dicarboxylic acids. Alternatively, an aromatic diamine, such as meta-xylylenediamine can be used to provide a partially aromatic polyamide.

Block copoly(amide) copolymers are also suitable as polyamide components. If the block copoly(amide) copolymer comprises e.g. a polyether oligomer or a polyalkylene ether, for example poly(ethylene oxide), then the block copolymer is a copoly(amide-ether). If the block copoly (amide) copolymer comprises an ester, for example a polylactone, such as polycaprolactone, then the block copolymer is a copoly(amide-ester). Preferably, the block copoly (amide) copolymer is a block copoly(amide-ester), a block copoly(amide-ether), or a mixture thereof.

Preferred polyamides are homopolymers or copolymers, the term copolymer referring to polyamides having two or more amide and/or diamide molecular repeat units. The polyamide component may comprise one or more aliphatic or semiaromatic polyamides, for example poly(pentamethylene decanediamide), poly(pentamethylene dodecanediamide), poly (e-caprolactam/hexamethylene hexanediamide), poly(e-caprolactam/hexamethylene-decanediamide), poly-(12-amino-dodecanamide), poly(12-amino-dodecanamide/tetramethylene terephthalamide) dodecanediamide); poly(tetramethylene hexanediamide), poly(e-caprolactam), poly(hexamethylene hexanediamide), poly((hexamethylene)dodecanediamide) and poly(hexamethylene tetradecanediamide); polyamides with semiaromatic repeat units derived from monomers and selected from one or more of the group consisting of aliphatic and/or aromatic dicarboxylic acids having 8 to 20 carbon atoms and aliphatic diamines having 4 to 20 carbon atoms.

The polyamide may also be a mixture of two or more polyamides.

Preferred polyamides have a melting temperature high enough not to impair the scope of application for the curable fluoroelastomer compositions.

Also preferred are polyamides formed by ring opening or condensation of aminocarboxylic acids.

Polyamides suitable for use in the invention are widely commercially available, for example Zytel®, Kevlar® available from E.I. du Pont de Nemours and Company, Wilmington, Delaware, U.S.A., Durethan®, available from Lanxess, Germany, and Ultramid® resins, available from BASF, U.S.A., Twaron®, available from TEIJIN, The Netherlands.

Polyimides in the sense of the invention include polymers whose most important structural feature is the imide group. Polyimides containing further structural elements, such as ester groups, amide groups, etc., such as polyetherimides (PEI) and polyamideimides (PAI), are also to be understood as polyimides according to the invention.

Particularly preferred polyimides or polyamide-imides can be obtained by polycondensation of at least one aromatic tetracarboxylic (di)anhydride or an aromatic tricarboxylic acid, preferably selected from the group consisting of 3,4, 3',4'-benzophenone-tetracarboxylic dianhydride, 1,2,4,5-benzene tetracarboxylic dianhydride, 3,4,3'4'-biphenyl-tetracarboxylic dianhydride, oxydiphthalic dianhydride, sulfonyldiphthalic dianhydride and 1,1,1,3,3,3-hexafluoro-2,2-propylidene diphthalic dianhydride, 1,3,4-benzene tricarboxylic acid and at least one aromatic diisocyanate, preferably selected from the group consisting of toluene-2,4-diisocyanate, toluene-2,6-diisocyanate, 4,4'-methylene diphenyl diisocyanate, 2,4,6-trimethyl-1,3-phenylene diisocyanate, 2,3,4,5-tetramethyl-1,4-phenylene diisocyanate or by reacting at least one tetracarboxylic (di)anhydride, preferably selected from the group consisting of 3,4,3',4'-benzophenone-tetracarboxylic dianhydride, 1,2,4,5-benzene tetracarboxylic dianhydride, 3,4,3'4'-biphenyl-tetracarboxylic dianhydride, oxydiphthalic dianhydride, sulfonyldiphthalic dianhydride and 1,1,1,3,3,3-hexafluoro-2,2-propylidene diphthalic dianhydride, 4,4'-(4,4'-isopropylidenediphenoxy) bis(phthalic anhydride), and at least one diamine, preferably selected from the group consisting of 2,4-diaminotoluene, 2,6-diaminotoluene, 4,4'-diaminodiphenylmethane, 2,4,6-trimethyl-1,3-phenylenediamine, 2,3,4,5-tetramethyl-1,4-phenylenediamine, bis(4-amino-3,5-dimethylphenyl)methane, bis(4-amino-3-methylphenyl)methane, 1,3-phenylenediamine, 1,4-phenylenediamine, 4,4'-diaminodiphenylether, 5(6)-amino-1-(4' aminophenyl)-1,3,-trimethylindane and subsequent imidization of the polyamide acid.

Particularly preferred polyimides include:

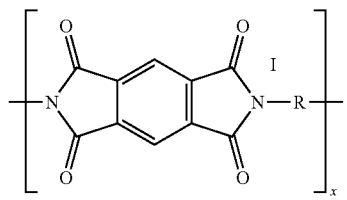
(A)

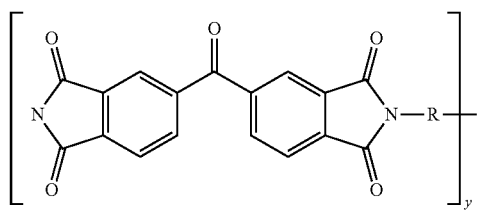
(B)

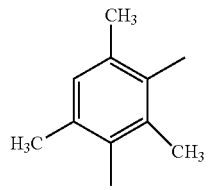
(L1)

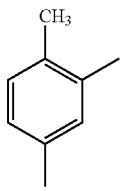
(L2)

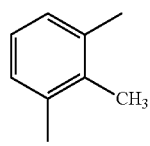
(L3)

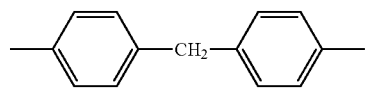
(L4)

where 0≤x≤0.5 and 1≥y≥0.5 and R corresponds to one or more, identical or different, radicals selected from the group consisting of L1, L2, L3 and L4.

Particularly preferably, x=0, y=1 and R consists of 64 mol % L2, 16 mol % L3 and 20 mol % L4. This polymer is commercially available under the name P84 or P84 type 70 from Evonik Fibers and is registered under CAS number: 9046-51-9. In a further particularly preferred polymer, x=0.4, y=0.6 and R consists of 80 mol % L2 and 20 mol % L3. This polymer is commercially available as P84HT from Evonik Fibers and is registered under CAS number: 134119-41-8.

Also suitable polyamide-imides are the polymers sold under the trade names Torion® and Kennel® and having the composition indicated below:

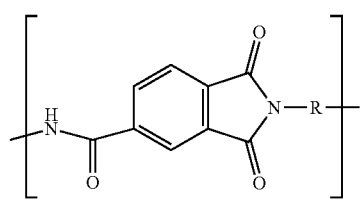
(III)

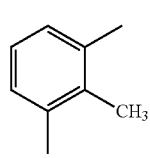
(L2)

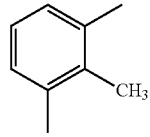
(L3)

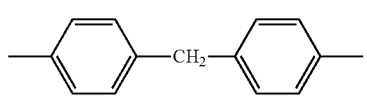

where the radical R corresponds to one or more, identical or different, radicals selected from the group consisting of L2, L3 and L4.

Polyimides suitable for use in the invention are widely commercially available, for example Polyimide P84® NT polyimide available from Evonik, Germany, Kapton®, Vespel® available from E.I. du Pont de Nemours and Company, Wilmington, Delaware, U.S.A., and Torlon®, available from Solvay, Belgium.

In a preferred embodiment of the invention, the fluoroelastomer composition in cured state has a volume swelling in 20% acetic acid after 168 h/95° C., measured according to DIN ISO 1817, of from 0 to 25 vol %, more preferably from 0 to 15 vol %, in particular from 0 to 10 vol %.

In a preferred embodiment of the invention, the fluoroelastomer composition in cured state has a compression set after 168 h/200° C., measured according to DIN ISO 815, of from 0 to 70 percent, for example 1 to 70 percent, more preferably from 0 to 60 percent, for example 1 to 60 percent, in particular from 0 to 40 percent, for example 1 to 40 percent.

The invention further relates to a method for preparing a curable fluoroelastomer composition according to one or more of the embodiments described according to the invention comprising the steps of:

A) providing a curable, preferably radically curable, in particular peroxide-curable fluoroelastomer;
B) providing a nitrogen-containing polymer selected from polyamide, polyimide, mixtures and/or copolymers thereof, the nitrogen-containing polymer being present in particle form having an average particle size in the range from 0.1 to 70 μm and/or in fiber form having an average fiber diameter in the range from 0.1 to 70 μm;
C) mixing the curable fluoroelastomer with the nitrogen-containing polymer at a temperature lower than whichever is the lower of melting temperature and decomposition temperature of the nitrogen-containing polymer to form a polymer mixture that has curable fluoroelastomer and 0.1 wt % to 30 wt % nitrogen-containing polymer based on the total weight of fluoroelastomer and nitrogen-containing polymer, and
D) adding a curing system, in particular a peroxide curing agent and a crosslinking co-agent, to the polymer mixture at a temperature lower than the lower of melting temperature and decomposition temperature of the nitrogen-containing polymer to form a curable fluoroelastomer composition.

The fluoroelastomer composition according to the invention is perfectly suitable for preparing seals, in particular O-rings, frame seals, radial shaft seals, bellow-type and valve stem seals.

A further subject matter of the present invention is a seal comprising a fluoroelastomer composition according to one or more of the embodiments described herein as well as its use in acidic media.

The invention is explained in more detail below with reference to several examples.

Materials used:
FKM 1: Peroxide-crosslinkable copolymer of vinylidene fluoride, tetrafluoroethylene and flexafluoropropylene, fluorine content 67%, Mooney viscosity 21 (ML1+10 @ 121° C.)
FKM 2: Peroxide-crosslinkable copolymer of vinylidene fluoride and hexafluoropropylene, fluorine content 66%, Mooney viscosity 30 (ML1+10 @ 121° C.)
Carbon black: Carbon black, thermal carbon black N-990
Peroxide: Dicumyl peroxide
Crosslinking co-agent: Triallyl isocyanurate
Polyamide 6: Polyamide 6 powder, particle size 20 μm
Polyamide 6,6: Polyamide fiber, fiber diameter 27-30 μm
Polyaramid 1: Polyaramid fiber pulp, 40% p-aramid, poly(p-phenylene terephthalamide) fiber diameter<70 μm
Polyaramid 2: Polyaramid powder, p-aramid, poly(p-phenylene terephthalamide) particle size>70 μm
Polyimide 1: Polyimide powder, POLYIMIDE P84® NT1, particle size 1-10 μm
Polyimide 2: Polyimide powder, POLYIMIDE P84® NT2, particle size 1-10 μm 1) Preparation of Various Peroxide-Curable Fluoroelastomer Masses Various peroxide-curable fluoroelastomer masses were prepared from the aforementioned materials in 2 stages with an internal mixer and a rolling mill suitable for preparing rubber mixtures. The tests were carried out on test plates which were vulcanized at 180° C. for 5 min and post-heated at 200° C. for 24 hours.

The following fluoroelastomer masses were prepared and tested for various parameters relevant for sealing applications.

CE1
Comparative mixture: FKM mixture free of metal oxides. The crosslinked material shows a marked decrease in tensile strength after air aging at 250° C. for 168 h with respect to CE2.

CE2
Comparative mixture: FKM mixture containing metal oxides, contains 1.5 phr ZnO.
The crosslinked material shows high swelling after storage in acetic acid.

EA1
Mixture containing polyamide 6: FKM mixture free of metal oxides having 3 phr polyamide 6.
The tensile strength is comparable to CE2 after air aging.

EA2
Mixture containing polyamide fibers: FKM mixture free of metal oxides having 3 phr polyamide 6.6 fiber.
The tensile strength is comparable to CE2 after air aging.
Swelling in acetic acid shows an improvement over CE1.

EA3
Mixture containing polyaramid fibers: FKM mixture free of metal oxides having 5 phr polyaramid fiber.
The measured compression sets are comparable to CE1 and CE2.
Swelling in acetic acid shows an improvement over CE1.

EA4
Polyaramid-containing mixture: FKM mixture free of metal oxides having 6 phr polyaramid powder.
The measured compression sets are comparable to CE1 and CE2.

Swelling in acetic acid shows an improvement over CE1.

EI1

Polyimide-containing mixture: FKM mixture free of metal oxides having 6 phr polyimide 1 powder.
The tensile strength after air aging at 250° C. for 168 h is comparable to CE2 and the measured compression sets are comparable to CE1 and CE2.
Swelling in acetic acid shows an improvement over CE1.

E12

Polyimide-containing mixture: FKM mixture free of metal oxides having 6 phr polyimide 2 powder.
The tensile strength after air aging at 250° C. for 168 h is comparable to CE2 and the measured compression sets are comparable to CE1 and CE2.
Swelling in acetic acid shows an improvement over CE1.

E13

Polyimide-containing mixture: FKM mixture free of metal oxides having another FKM base polymer and 6 phr polyimide 2 powder.
The tensile strength after air aging at 250° C. for 168 h is comparable to CE2 and the measured compression sets are comparable to CE1 and CE2.
Swelling in acetic acid shows an improvement over CE1.

E14

Polyimide-containing mixture: FKM mixture free of metal oxides having another FKM base polymer and 30 phr polyimide 1 powder.
The measured compression sets are comparable to CE1 and CE2.

E15

Polyimide-containing mixture: FKM mixture free of metal oxides having another FKM base polymer and 30 phr polyimide 2 powder.
Swelling in acetic acid shows an improvement over CE1.

2) Test Results

The results of the tests are shown in the table below.

It is found that the polyimide-containing mixtures EI1, EI2 and EI3 demonstrate the best properties with regard to air aging and swelling in acetic acid, as well as no significant deterioration in compression set over CE1 and CE2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

| | CE 1 | CE 2 | EA 1 | EA2 | EA3 | EA4 | EI1 | EI2 | EI3 | EI4 | EI5 |
|---|---|---|---|---|---|---|---|---|---|---|---|
| Composition phr | | | | | | | | | | | |
| FKM-1 | 100 | 100 | 100 | 100 | 100 | 100 | 100 | 100 | | 100 | 100 |
| FKM-2 | | | | | | | | | 100 | | |
| Carbon black | 30 | 30 | 30 | 30 | 30 | 30 | 30 | 30 | 30 | | |
| Peroxide | 0.8 | 0.8 | 0.8 | 0.8 | 0.8 | 0.8 | 0.8 | 0.8 | 0.8 | 0.8 | 0.8 |
| Crosslinking co-agent | 2.2 | 3.2 | 2.2 | 2.2 | 2.2 | 2.2 | 2.2 | 2.2 | 2.2 | 2.2 | 2.2 |
| Zinc oxide | | 1.5 | | | | | | | | | |
| Polyamide 6 | | | 3 | | | | | | | | |
| Polyamide 6.6 | | | | 3 | | | | | | | |
| Polyaramid 1 | | | | | 5 | | | | | | |
| Polyaramid 2 | | | | | | 6 | | | | | |
| Polyimide 1 | | | | | | | 6 | | | 30 | |
| Polyimide 2 | | | | | | | | 6 | 6 | | 30 |
| Physical properties | | | | | | | | | | | |
| Tensile strength (N/mm$^2$) | | | | | | | | | | | |
| Initial values | 17.3 | 16.4 | 16.8 | 12.8 | 12.9 | 12.9 | 14.6 | 20.5 | 19.0 | 10.4 | 14.9 |
| Air aging 250° C./168 h | 6.5 | 10.1 | 10.2 | 8.5 | 8.6 | 6.2 | 10.4 | 10.2 | 9.8 | 8.7 | 8.6 |
| Compression set (%) | | | | | | | | | | | |
| 200° C./168 h | 34 | n.t. | 59 | 51 | 33 | 35 | 36 | 38 | 44 | 39 | 50 |
| 168 h/250° C. | 76 | 64 | 104 | 116 | 68 | 61 | 69 | 70 | 70 | 82 | 78 |
| Swelling in 20% acetic acid, 95° C./168 h (%) | 7 | 39 | 7 | 4 | 4 | 3 | 3 | 3 | 2 | 7 | 3 |

The invention claimed is:

1. A method for sealing off at least two media from each other, of which at least one is acidic, the method comprising:
   providing a curable fluoroelastomer in an amount of 40% wt to 95% wt, wherein the curable fluoroelastomer is classified as FKM in ASTM-D 1418;
   providing a nitrogen-containing polymer selected from polyamide, polyimide, mixtures and/or copolymers thereof, the nitrogen-containing polymer being present in particle form having an average particle size in the range from 0.1 to 70 μm and/or in fiber form having an average fiber diameter in the range from 0.1 to 70 μm, wherein the nitrogen-containing polymer has a melting temperature determined according to ASTM D3418-08 or a decomposition temperature of greater than 180° C.;
   mixing the curable fluoroelastomer with the nitrogen-containing polymer at a temperature lower than whichever is the lower of melting temperature and decomposition temperature of the nitrogen-containing polymer to form a polymer mixture that has curable fluoroelastomer and 0.1 wt % to 30 wt % nitrogen-containing polymer based on the total weight of fluoroelastomer and nitrogen-containing polymer;
   adding a curing system to the polymer mixture at a temperature lower than the lower of melting temperature and decomposition temperature of the nitrogen-containing polymer to form a curable fluoroelastomer composition, wherein an amount of metal oxide functioning as an acid acceptor in the curable fluoroelastomer composition is less than 1.5 wt %, and/or an amount of metal salt functioning as an acid acceptor in the curable fluoroelastomer composition is less than 5 wt %;
   providing a filler in an amount of 1 wt % to 70 wt % of a total weight of the curable fluoroelastomer composition;
   curing the curable fluoroelastomer composition so as to produce a seal; and
   disposing the seal between the at least two media, wherein at least one of the at least two media is acidic.

2. The method of claim 1, further comprising:
   providing an amount of metal hydroxide functioning as an acid acceptor of less than 1.5 wt %, wherein the quantities are based in each case on a total weight of the curable fluoroelastomer composition.

3. The method of claim 2, wherein the metal oxide functioning is selected from a group comprising zinc oxide, magnesium oxide, calcium oxide and lead oxide, wherein the metal hydroxide comprises calcium hydroxide, and wherein the metal salt is selected from a group comprising hydrotalcite, calcium, and magnesium stearate.

4. The method of claim 1, wherein the curable fluoroelastomer composition is radically curable.

5. The method of claim 1, wherein the curable fluoroelastomer composition is peroxide-curable.

6. The method of claim 1, wherein the nitrogen-containing polymer is solid at a curing temperature of the curable fluoroelastomer composition.

7. The method of claim 1, wherein the curable fluoroelastomer composition in a cured state has a volume swelling in 20% acetic acid after 168 h/95° C., measured in accordance with DIN ISO 1817, from 0 to 25 vol %.

8. The method of claim 7, wherein the curable fluoroelastomer composition in the cured state has a volume swelling in 20% acetic acid after 168 h/95° C., measured in accordance with DIN ISO 1817, from 0 to 15 vol %.

9. The method of claim 7, wherein the curable fluoroelastomer composition in the cured state has a volume swelling in 20% acetic acid after 168 h/95° C., measured in accordance with DIN ISO 1817, from 0 to 10 vol %.

10. The method of claim 1, wherein the curable fluoroelastomer composition in a cured state has a compression set after 168 h/200° C., measured in accordance with DIN ISO 815, from 0 to 70%.

11. The method of claim 10, wherein the curable fluoroelastomer composition in the cured state has a compression set after 168 h/200° C., measured in accordance with DIN ISO 815, from 0 to 60%.

12. The method of claim 10, wherein the curable fluoroelastomer composition in the cured state has a compression set after 168 h/200° C., measured in accordance with DIN ISO 815, from 0 to 40%.

13. The method of claim 1, wherein the seal is at least one of an O-ring seal, frame seal, radial shaft seal, bellow-type seal, and valve stem seal.

14. The method of claim 1, wherein the filler is an amount of 10 wt % to 70 wt % of the total weight of the curable fluoroelastomer composition.

15. The method of claim 1, wherein the filler is an amount of 10 wt % to 30 wt % of the total weight of the curable fluoroelastomer composition.

16. The method of claim 1, wherein the filler comprises carbon black.

17. A method for sealing off at least two media from each other, of which at least one is acidic, the method comprising:
   providing a curable fluoroelastomer in an amount of 40% wt to 95% wt, wherein the curable fluoroelastomer is classified as FKM in ASTM-D 1418;
   providing a nitrogen-containing polymer selected from polyamide, polyimide, mixtures and/or copolymers thereof, the nitrogen-containing polymer being present in particle form having an average particle size in the range from 0.1 to 70 μm and/or in fiber form having an average fiber diameter in the range from 0.1 to 70 μm, wherein the nitrogen-containing polymer has a melting temperature determined according to ASTM D3418-08 or a decomposition temperature of greater than 180° C.;
   mixing the curable fluoroelastomer with the nitrogen-containing polymer at a temperature lower than whichever is the lower of melting temperature and decomposition temperature of the nitrogen-containing polymer to form a polymer mixture that has curable fluoroelastomer and 0.1 wt % to 30 wt % nitrogen-containing polymer based on the total weight of fluoroelastomer and nitrogen-containing polymer;
   adding a curing system to the polymer mixture at a temperature lower than the lower of melting temperature and decomposition temperature of the nitrogen-containing polymer to form a curable fluoroelastomer composition, wherein an amount of metal salt functioning as an acid acceptor in the curable fluoroelastomer composition is less than 5 wt %;
   providing a filler in an amount of 1 wt % to 70 wt % of a total weight of the curable fluoroelastomer composition;
   curing the curable fluoroelastomer composition so as to produce a seal; and
   disposing the seal between the at least two media, wherein at least one of the at least two media is acidic.

* * * * *